(12) United States Patent
Rapaport et al.

(10) Patent No.: US 11,139,889 B2
(45) Date of Patent: Oct. 5, 2021

(54) IMPLEMENTING A LI-FI TRANSCEIVER BY REUSING ELEMENTS DESIGNED FOR A WI-FI DEVICE

(71) Applicant: CELENO COMMUNICATIONS (ISRAEL) LTD., Raanana (IL)

(72) Inventors: Albert Rapaport, Shoham (IL); Shlomi Arbel, Shoham (IL); Gil Rosenzweig, Kfar Saba (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 0 days.

(21) Appl. No.: 16/709,940

(22) Filed: Dec. 11, 2019

(65) Prior Publication Data

US 2020/0195342 A1   Jun. 18, 2020

Related U.S. Application Data

(60) Provisional application No. 62/780,269, filed on Dec. 16, 2018.

(51) Int. Cl.
*H04B 10/114* (2013.01)
*H04B 10/116* (2013.01)
(Continued)

(52) U.S. Cl.
CPC ....... *H04B 10/114* (2013.01); *H04B 10/0795* (2013.01); *H04B 10/40* (2013.01);
(Continued)

(58) Field of Classification Search
CPC .......................................... H04B 10/114–116
See application file for complete search history.

(56) References Cited

U.S. PATENT DOCUMENTS

| 2004/0028003 | A1* | 2/2004 | Diener | ................. | H04L 1/0001 |
| | | | | | 370/319 |
| 2011/0028752 | A1* | 2/2011 | Yoshitomo | ............ | C07C 69/712 |
| | | | | | 560/53 |

(Continued)

FOREIGN PATENT DOCUMENTS

| CN | 103427903 B | 1/2016 |
| CN | 207753719 U | 8/2018 |

(Continued)

OTHER PUBLICATIONS

IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", pp. 1-425, 2013.

(Continued)

*Primary Examiner* — Nathan M Cors
(74) *Attorney, Agent, or Firm* — Kligler & Associates

(57) ABSTRACT

A Wireless LAN (WLAN) Li-Fi transceiver includes a Wi-Fi device and an Analog Front-End (AFE). The Wi-Fi device is configured to produce a spatial stream carrying data, and to produce from the spatial stream In-phase and Quadrature (I/Q) signals for transmission over a radio channel having a predefined Radio Frequency (RF) band. The Analog Front-End (AFE) is configured to modify the I/Q signals, or modify operation of the Wi-Fi device, for producing a real Li-Fi signal in a predefined optical band, and to transmit the data carried by the spatial stream to a remote Li-Fi receiver by driving an optical emitter with the real Li-Fi signal.

10 Claims, 8 Drawing Sheets

(51) Int. Cl.
    *H04B 10/40*     (2013.01)
    *H04L 5/00*     (2006.01)
    *H04W 84/12*     (2009.01)
    *H04B 10/61*     (2013.01)
    *H04B 10/50*     (2013.01)
    *H04B 10/079*     (2013.01)

(52) U.S. Cl.
    CPC ......... *H04B 10/502* (2013.01); *H04B 10/613* (2013.01); *H04L 5/0007* (2013.01); *H04W 84/12* (2013.01)

(56) References Cited

U.S. PATENT DOCUMENTS

2016/0352422 A1     12/2016   Yue et al.
2019/0238227 A1*   8/2019   Bottari .................. H04W 24/08

FOREIGN PATENT DOCUMENTS

CN           106341186 B     11/2018
WO     WO2019/100789    *   5/2019   ........... H04B 10/116

OTHER PUBLICATIONS

"IEEE 802.11bb Reference Channel Models for Indoor Environments", IEEE P802.11—Wireless LANs, pp. 1-45, Sep. 2018.
International Application # PCT/IB2019/060643 search report dated Feb. 13, 2020.

\* cited by examiner

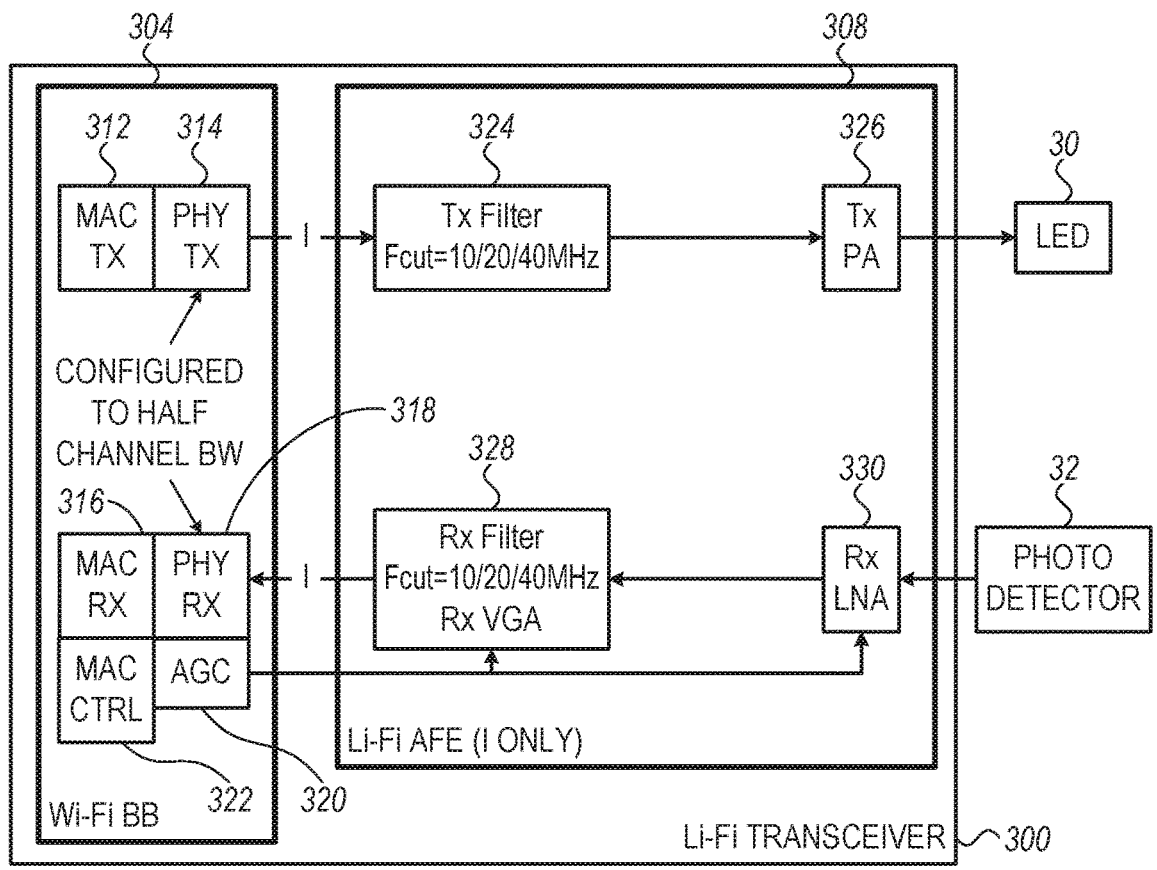
FIG. 5A
FIG. 5B
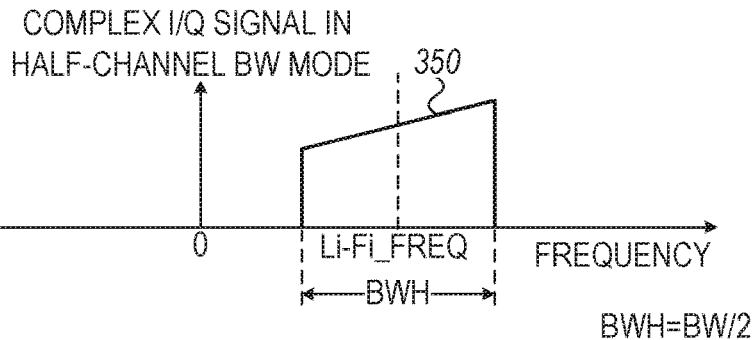
FIG. 5C
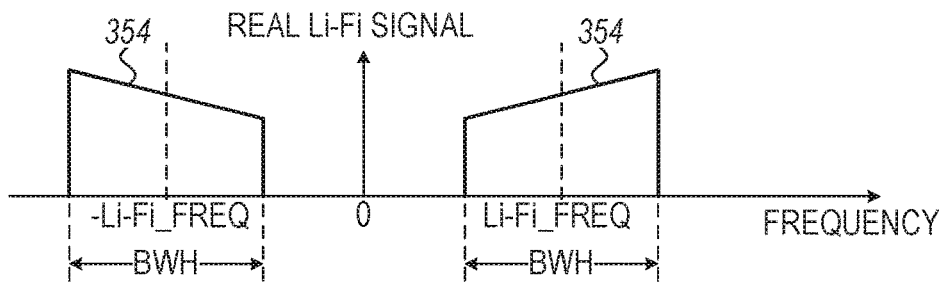

IMPLEMENTING A LI-FI TRANSCEIVER BY REUSING ELEMENTS DESIGNED FOR A WI-FI DEVICE

CROSS-REFERENCE TO RELATED APPLICATIONS

This application claims the benefit of U.S. Provisional Patent Application 62/780,269, filed Dec. 16, 2018, whose disclosure is incorporated herein by reference.

TECHNICAL FIELD

Embodiments described herein relate generally to communication systems, and particularly to methods and systems for implementing a wireless Li-Fi transceiver by reusing Wi-Fi elements.

BACKGROUND

"Light Fidelity," also referred to as "Li-Fi," is a high-speed wireless communication technology, in which data is transmitted over a light channel. Li-Fi devices may operate over the visible and invisible (ultraviolet and infrared) light spectrums.

SUMMARY

An embodiment that is described herein provides a Wireless LAN (WLAN) Li-Fi transceiver that includes a Wi-Fi device and an Analog Front-End (AFE). The Wi-Fi device is configured to produce a spatial stream carrying data, and to produce from the spatial stream In-phase and Quadrature (I/Q) signals for transmission over a radio channel having a predefined Radio Frequency (RF) band. The Analog Front-End (AFE) is configured to modify the I/Q signals, or modify operation of the Wi-Fi device, for producing a real Li-Fi signal in a predefined optical band, and to transmit the data carried by the spatial stream to a remote Li-Fi receiver by driving an optical emitter with the real Li-Fi signal.

In some embodiments, the Wi-Fi device includes a frequency converter configurable to produce the I/Q signals in the RF band or in the optical band and to combine the I/Q signals to produce a real signal in the RF band or optical band, and the AFE is configured to modify operation of the Wi-Fi device by configuring the frequency converter to produce the I/Q signals in the optical band. In other embodiments, the Wi-Fi device is configured to produce from the I/Q signals a real Wi-Fi signal in the RF band, and the AFE includes a frequency down-converter configured to down convert the real Wi-Fi signal from the RF band to the optical band. In yet other embodiments, the Wi-Fi device is configured to operate in a partial-bandwidth mode, in which the I/Q signals occupy only part of an allocated channel bandwidth, and the AFE is configured to produce the real Li-Fi signal based only on an I signal component or on a Q signal component of the I/Q signals.

In an embodiment, the Wi-Fi device is configured to produce complex-valued signals including OFDM symbols, and to produce the I/Q signals based on respective real and imaginary components of the complex-valued signals. In another embodiment, the AFE is configured to receive from the remote Li-Fi receiver, via a photo detector, an uplink real Li-Fi signal in the optical band and to produce from the uplink real Li-Fi signal, uplink I/Q signals, and the Wi-Fi device is configured to process the uplink I/Q signals for extracting data carried in the uplink real Li-Fi signal.

In some embodiments, the Wi-Fi device is configured to connect to an optical interface for communicating over Li-Fi or to a RF interface for communicating over Wi-Fi, the Wi-Fi device is configured to produce a real Wi-Fi signal in the RF band, the optical interface is configured to apply frequency conversion between the RF band of the real Wi-Fi signal and the optical band, and the RF interface is configured to connect between the Wi-Fi device and a RF antenna. In other embodiments, at least one of the Wi-Fi device and the AFE is configured to monitor Li-Fi communication quality level via the optical interface, and in response to detecting that communication via the optical interface degrades below a predefined quality level, the AFE is configured to communicate the real Wi-Fi signal via the RF interface. In yet other embodiments, the AFE is configured to communicate the real Wi-Fi signal via both the optical interface and the RF interface, in parallel.

There is additionally provided, in accordance with an embodiment that is described herein, a method for wireless communication, including, in a Wireless LAN (WLAN) Li-Fi transceiver, including a Wi-Fi device and an Analog Front-End (AFE), producing, by the Wi-Fi device, a spatial stream carrying data, and producing from the spatial stream In-phase and Quadrature (I/Q) signals for transmission over a radio channel having a predefined Radio Frequency (RF) band. The I/Q signals are modified or operation of the Wi-Fi device is modified, by the AFE, for producing a real Li-Fi signal in a predefined optical band. The data carried by the spatial stream is transmitted to a remote Li-Fi receiver by driving an optical emitter with the real Li-Fi signal.

These and other embodiments will be more fully understood from the following detailed description of the embodiments thereof, taken together with the drawings in which:

BRIEF DESCRIPTION OF THE DRAWINGS

FIGS. 3B and 30 are diagrams that schematically illustrate spectral density functions of I/Q signals and Li-Fi signals processed in Li-Fi AFE of FIG. 3A, in accordance with an embodiment that is descried herein;

FIG. 5A is a block diagram that schematically illustrates a Li-Fi transceiver in which a Li-Fi signal is produced from only the I component of a complex signal produced by a PHY subsystem configured to operate in a partial-bandwidth mode, in accordance with an embodiment that is described herein;

FIGS. 5B and 5C are diagrams that schematically illustrate spectral density functions of complex signals in a partial-bandwidth mode of the PHY subsystem and Li-Fi signals processed in Li-Fi transceiver of FIG. 5A, in accordance with an embodiment that is descried herein;

DETAILED DESCRIPTION OF EMBODIMENTS

Overview

Figure 1:
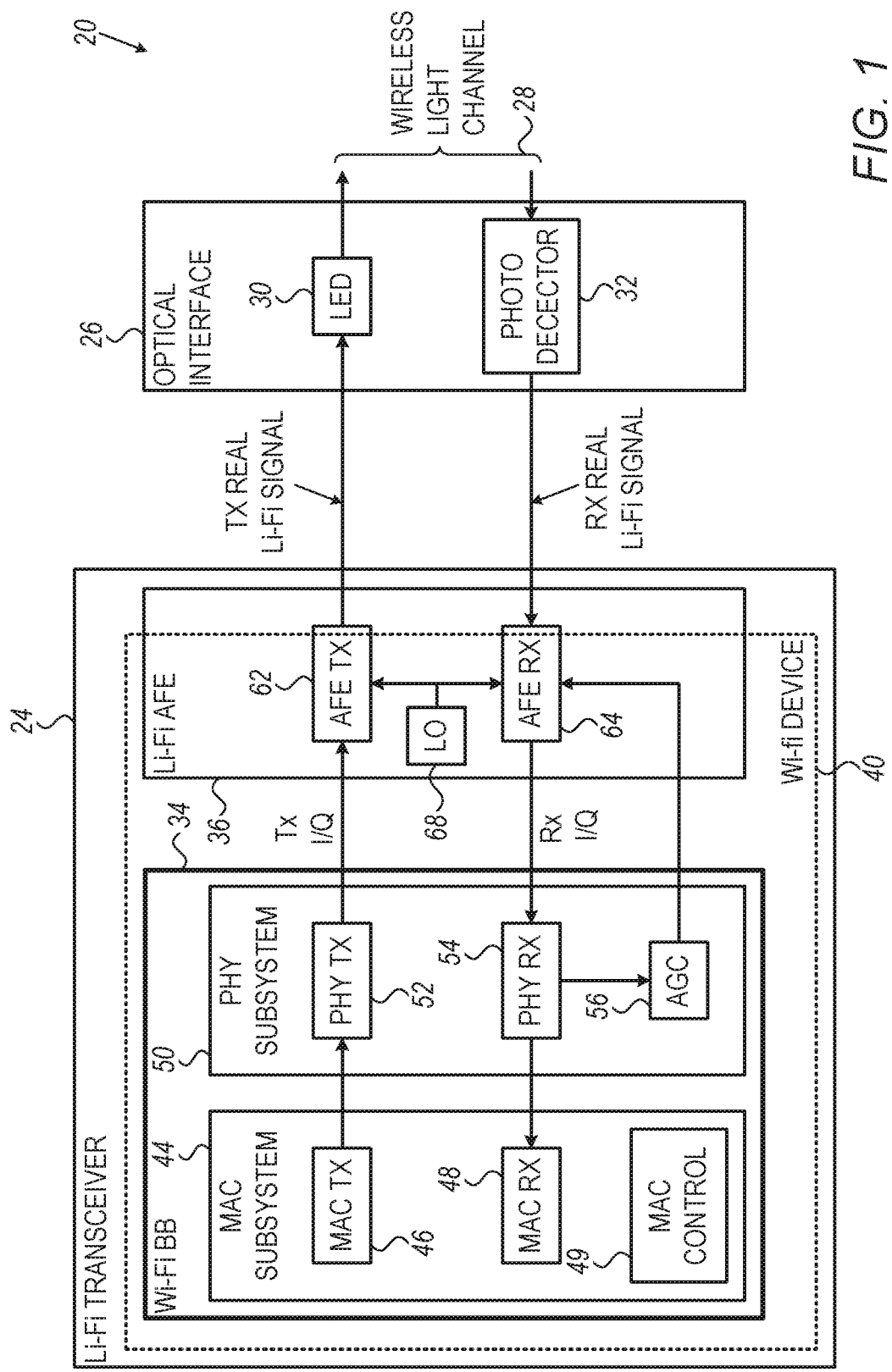
FIG. 1 is a block diagram that schematically illustrates a wireless Li-Fi system implemented by reusing Wi-Fi elements, in accordance with an embodiment that is described herein.

Embodiments that are described herein provide methods and systems for implementing a wireless Li-Fi transceiver by reusing elements designed for Wi-Fi devices.

Wireless light communication may be advantageous compared to radio communication in various aspects. For example, the light spectrum (as used, e.g., in Li-Fi) is much wider compared to the Radio Frequency (RF) spectrum (as used, e.g., in Wi-Fi), offers higher data rates, and is usable in areas susceptible to electromagnetic interference such as aircrafts and hospitals. Moreover, communication over light supports data densities that are significantly higher than in RF, due to the almost unlimited bandwidth of the visible/invisible light spectrum. Light communication also provides enhanced physical layer security by directing a narrow light beam to selected directions. With the advent of the Power-over-Ethernet (PoE) technology and its usage in lighting, backhaul connectivity to the Internet may be implemented using a light source and a Li-Fi modem.

In Li-Fi devices, data is typically communicated over light by (i) driving an optical emitter such as a Light Emitting Diode (LED) with a data-carrying signal in the transmit direction, and (ii) converting a data-carrying light beam into an electrical signal using a photo detector device in the receive direction.

In the present context and in the claims, the term "Wi-Fi RF band, or simply "RF band" for brevity, refers to herein as a frequency band in the RF spectrum specified for Wi-Fi. Similarly, the term "Li-Fi optical band" or simply "optical band" for brevity, refers to herein as a frequency band in the visible or invisible light spectrum specified for Li-Fi.

In the embodiments that will be described below, elements of a Wi-Fi device are reused in implementing a Li-Fi transceiver. The Wi-Fi device operates in accordance with Wi-Fi standards specified, for example, in the IEEE 802.11 family of standards. The IEEE 802.11bb Task Group on Light Communications focuses on modifications to the base IEEE 802.11 standards required to enable communications in the light medium. A conventional Wi-Fi device typically generates a real Wi-Fi signal by first generating a Base Band<BB) complex signal comprising In-phase and Quadrature (I/Q>signals. The I/Q signals are up-converted to a suitable Wi-Fi RF band, such as the 2.4 GHz band or the 5.5 GHz RF band specified in the IEEE 802.11 family of standards, and are combined to generate the real Wi-Fi signal for transmission via a RF antenna. The Wi-Fi device may be implemented using a Wi-Fi baseband (BB) module that handles the MAC and PHY layers, and a Wi-Fi RF module that handles frequency conversion between baseband and RF.

In contrast, a Li-Fi signal comprises a real baseband signal that drives a light source such as a LED. In principle, a Li-Fi transceiver could generate the real Li-Fi signal directly and independently from any Wi-Fi device or Wi-Fi specifications.

Embodiments that will be described in detail below make use of elements of a Wi-Fi transceiver in implementing a Li-Fi transceiver, which is advantageous, e.g., in terms of cost and design effort.

Consider a Wireless LAN (WLAN) Li-Fi transceiver, comprising a Wi-Fi device and an Analog Front-End (AFE). The Wi-Fi device is configured to produce a spatial stream carrying data, and to produce from the spatial stream In-phase and Quadrature (I/Q) signals for transmission over a radio channel having a predefined Radio Frequency (RF) band. The AFE is configured to modify the I/Q signals, or modify operation of the Wi-Fi device, for producing a real Li-Fi signal in a predefined optical band, and to transmit the data carried by the spatial stream to a remote Li-Fi receiver by driving an optical emitter (e.g., a LED) with the real Li-Fi signal.

As will be described in detail below, the Li-Fi transceiver may be implemented in various embodiments, and each such embodiment may reuse different parts of the Wi-Fi device, as will be described below.

In some embodiments, the Wi-Fi device comprises a frequency converter configurable to produce the I/Q signals in the RF band or in the optical band, and to combine the I/Q signals to produce a real signal in the RF band or optical band. In such embodiments, the AFE is configured to modify operation of the Wi-Fi device by configuring the frequency converter to produce the I/Q signals in the optical band (and not in the RF band). In an embodiment of this sort, a Wi-Fi RF module of the Wi-Fi device is modified to be reused for Li-Fi.

In some embodiments, the Wi-Fi device is configured to produce from the I/Q signals a real Wi-Fi signal in the RF band (using frequency up-conversion), and the AFE comprises a frequency down-converter, configured to down convert the real Wi-Fi signal from the RF band to the optical band. In these embodiments, the Li-Fi transceiver may generate the Wi-Fi real signal by reusing a Wi-Fi RF module of a Wi-Fi device.

In yet other embodiments, the Wi-Fi device is configured to operate in a partial-bandwidth mode, in which the I/Q signals occupy only part (e.g., half 40 MHz/80 MHz or quarter 20 MHz/80 MHz) of an allocated channel bandwidth. In these embodiments, the AFE is configured to produce the real Li-Fi signal based only on an I signal component or on a Q signal component of the I/Q signals.

In some embodiments, the Wi-Fi device (e.g., the PHY subsystem of the Wi-Fi device) is configured to produce complex-valued signals comprising OFDM symbols, and to produce the I/Q signals based on respective real and imaginary components of the complex-valued signals.

In some embodiments, the AFE is configured to receive from the remote Li-Fi receiver, via a photo detector, an uplink real Li-Fi signal in the optical band, and to produce from the uplink real Li-Fi signal, uplink I/Q signals, wherein the Wi-Fi device is configured to process the uplink I/Q signals for extracting data carried in the uplink real Li-Fi signal.

In some embodiments, the Wi-Fi device is configured to connect to an optical interface for communicating over Li-Fi, or to a RF interface for communicating over Wi-Fi, wherein the Wi-Fi device is configured to produce a real Wi-Fi signal in the RF band, the optical interface is configured to apply frequency conversion between the RF band of the real Wi-Fi signal and the optical band, and the RF interface is configured to connect between the Wi-Fi device and a RF antenna.

A WLAN transceiver supporting both Li-Fi and Wi-Fi may select communication over Li-Fi and/or over Wi-Fi in various ways. In an example embodiment, the WLAN transceiver operates over Li-Fi, and when communication over Li-Fi fails, e.g., due to blocking the light channel, switches to communicate over Wi-Fi. In some alternative embodiments, the AFE is configured to communicate the real Wi-Fi signal via both the optical interface and the RF interface, in parallel. Other suitable methods for dynamically switching between Li-Fi and Wi-Fi communication based on suitable criteria can also be used.

In the disclosed techniques, a Li-Fi transceiver that communicates over a light channel is implemented by reusing elements of a Wi-Fi device designed to communicate over a radio channel. The Wi-Fi device produces a complex signal comprising I/Q signals. The I/Q signals and/or operation of the Wi-Fi device are modified to produce a real Li-Fi signal suitable for driving a light emitting device. By reusing elements of a Wi-Fi device, development effort and product cost of the Li-Fi transceiver are reduced significantly.

System Description

FIG. 1 is a block diagram that schematically illustrates a wireless Li-Fi system 20 implemented by reusing Wi-Fi elements, in accordance with an embodiment that is described herein.

Li-Fi system 20 comprises a Li-Fi transceiver 24 coupled to an optical interface 26 for bidirectional communication with remote Li-Fi devices (not shown) over a wireless light channel 28. Optical interface 26 comprises an optical emitter 30 that converts electrical signal carrying data into light in a predefined optical band, and a photo detector 32 that receives light signal carrying data in the predefined optical band and converts the light signal into an electrical signal. In the present example, optical emitter 30 comprises a Light Emitting Diode (LED). Alternatively, other suitable optical emitters can be used, such as, for example, a Laser diode. Photo detector 32 may comprise any type of photo detector or photo sensor such as, for example, an avalanche Photo Diode (APD).

In the present context and in the claims, the term "optical band" refers to a frequency range in one or more of the visible-light, spectrum, the infrared spectrum and the ultraviolet spectrum, specified for Li-Fi communication.

Li-Fi system 20 may be used in various wireless applications such as in environments that are sensitive to electromagnetic interference, indoor secure communications via light and wireless communication, e.g., via streetlights, to name a few. Another example usage of Li-Fi is a lighting system in airplanes that provides both illumination and user access to the Internet.

Li-Fi transceiver 24 may comprise an Access Point for wireless communication over light with remote Li-Fi client stations. Alternatively/Li-Fi transceiver 24 may comprise a Li-Fi client station that communicates over light with a Li-Fi AP and/or with one or more other Li-Fi devices.

In the example of FIG. 1, Li-Fi transceiver 24 comprises a Wi-Fi Baseband (BE) 34 coupled to a Li-Fi Analog Front End (AFE) 36. In some embodiments, Wi-Fi BB 34 is implemented in accordance with the IEEE 802.11 family of standards. In the transmit direction, Wi-Fi BB 34 produces TX In-Phase and Quadrature (I/Q) signals, from which Li-Fi AFE 36 produces a TX real Li-Fi signal for driving LED 30. In the receive direction, Li-Fi AFE 36 receives a RX real Li-Fi signal via photo detector 32 and produces from the RX real Li-Fi signal RX I/Q signals to be processed by Wi-Fi BB 34 for recovering data carried in the received RX real Li-Fi signal.

In the example of FIG. 1, Wi-Fi BB 34 and at least part of Li-Fi AFE 36 are comprised in a Wi-Fi device 40, depicted in dashed lines. Wi-Fi device 40 is designed to communicate Wi-Fi signals over a radio channel having a predefined Wi-Fi RF band, e.g., in accordance with the IEEE 802.11 family of standards. As will be described in detail below, in various embodiments of Li-Fi transceiver 24, relevant elements of Wi-Fi device 40 are shared with Li-Fi AFE 36.

Wi-Fi BB 34 comprises a MAC subsystem 44 comprising a MAC TX 46, a MAC RX 48 and a MAC controller 49. Wi-Fi BB 34 further comprises a PHY subsystem 50 comprising a PHY TX 52, a PHY RX 54 and an Automatic Gain Control (AGC) 56. In some embodiments, MAC subsystem 44 and PHY subsystem 50 implement a MAC sublayer and a PHY sublayer, respectively, e.g., in accordance with the IEEE 802.11 standards.

The MAC sublayer executed by MAC subsystem 44 coordinates access to the shared physical air interface for using time and frequency resources effectively. In the present context, the term "air interface" refers to the communication link between Li-Fi system 20 and the remote Li-Fi devices over the optical band. As will be described further below, in some transceiver configurations, the "air interface" is used for both light communication over a Li-Fi optical band and for radio communication over a Wi-Fi RF band.

In the transmit direction, MAC TX 46 receives data from a higher sublayer, referred to as Logical Link Control (LLC). Alternatively or additionally, MAC TX 46 produces the data internally. MAC TX constructs MAC frames containing the data, header and tail fields, and sends the MAC frames to PHY TX 52 that produces from the MAC frames packets for transmission via the Li-Fi AFE. The packets are typically protected using a suitable Error Correction Code (ECC), as will be described below. In the receive direction, PHY RX 54 provides packets received vi the Li-Fi AFE to MAC RX 48, which processes the packets to recover the MAC frames, and extract data contained in the MAC frames. AGC 56 controls the gain along the reception path by controlling the gain of one or more elements in Li-Fi AFE 36, as will be described below. When a packet is received in error at the remote station, MAC subsystem 44 may coordinate retransmission of the corresponding MAC frame.

In some embodiments, MAC subsystem 44 handles multiple access using methods such as carrier sensing, packet detection and random back-off, to avoid collisions among multiple users of the air interface.

Li-Fi AFE 36 comprises an AFE TX 62, an AFE RX 64 and a Local Oscillator (LO) 68. AFE TX 62 produces from the TX I/Q signals of Wi-Fi SB 34, a TX real Li-Fi signal for driving LED 30. AFE RX 64 receives a RX real Li-Fi signal from photo detector 32, and produces from the RX real Li-Fi signal RX I/Q signals to be processed by Wi-Fi BB 34. LO 68 generates a LO signal that AFE TX 62 and AFE RX 64 use for frequency up/down-conversion between baseband and a desired frequency band, as will be described in detail below.

In some embodiments, LO 68 is configurable to produce a Li-Fi LO signal for communication over a Li-Fi optical band or a Wi-Fi LO signal for communication over a Wi-Fi RF band. This allows reusing a Wi-Fi device modified to support both modes for Li-Fi communication, by configuring LO 68 to generate the Li-Fi LO signal.

Figure 2:
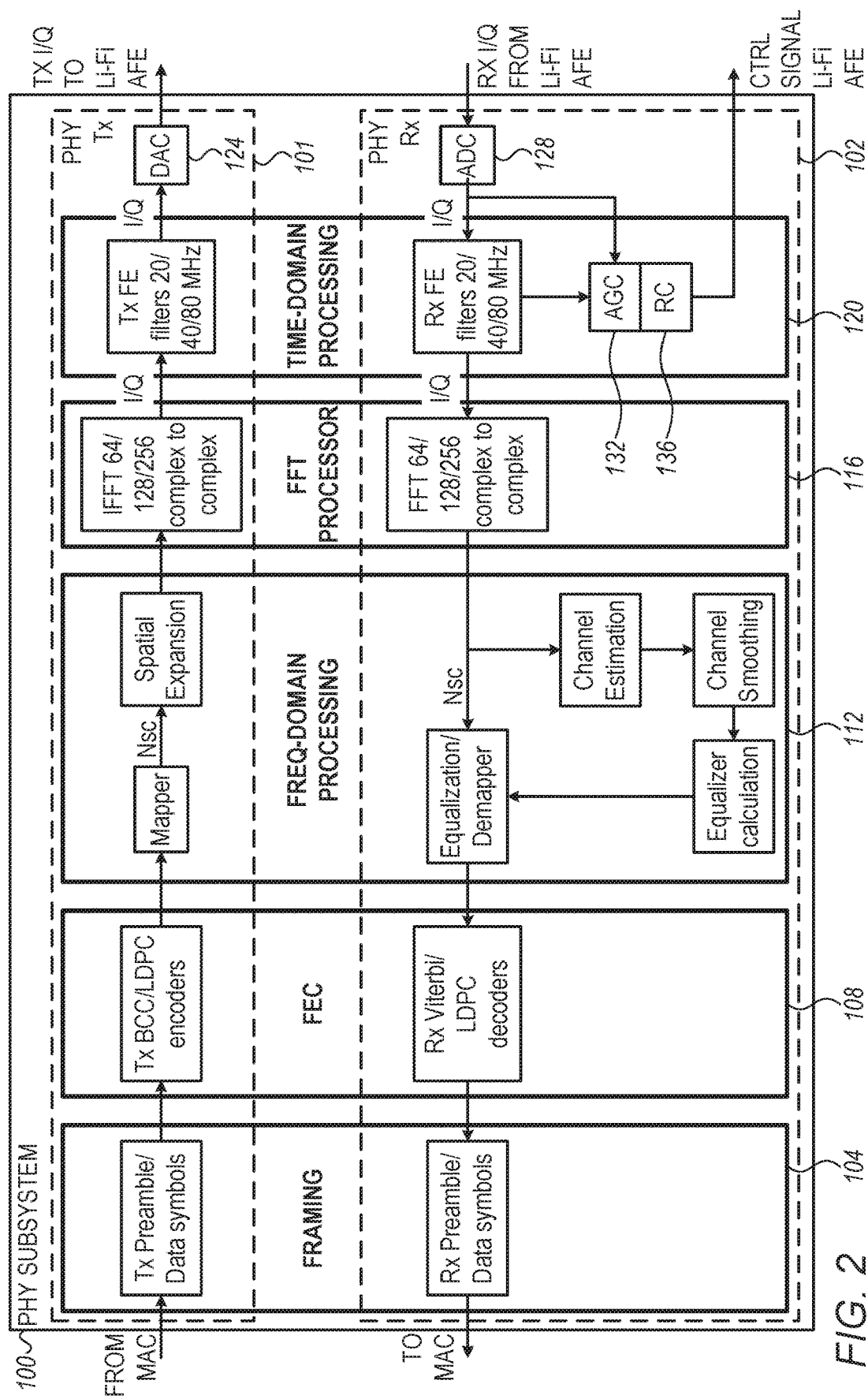
FIG. 2 is a block diagram that schematically illustrates a PHY subsystem, implementing the physical layer of Li-Fi transceiver of FIG. 1, in accordance with an embodiment that is described herein.

FIG. 2 is a block diagram that schematically illustrates a PHY subsystem 100, implementing the physical layer of Li-Fi transceiver 24 of FIG. 1, in accordance with an embodiment that is described herein.

PHY subsystem 100 comprises a PHY TX 101 and a PHY RX 102, which may be used, for example, in implementing PHY TX 52 and PHY RX 54 of PHY subsystem 50.

The data path in PHY subsystem 100 comprises a framing module 104, a Forward Error Correction (FEC) module 108, a frequency-domain processing module 112, a Fast Fourier Transform (FFT) processor 116, a time-domain processing module 120, a Digital to Analog Converter (DAC) 124 and an Analog to Digital Converter (ADC) 128.

In the transmit direction (within PHY TX 101) framing module 104 receives data from MAC subsystem 44, e.g., in the form of MAC frames. Framing module 104 adds to the MAC frames one or more preamble fields to produce packets for transmission. The preamble fields are typically used by the remote receiver for synchronization and channel estimation. The actual preamble fields and their formatting typically depends on the type of the underlying packets.

FEC module 108, encodes the packet payload using a suitable Error Correction Code (ECC). In accordance with some IEEE 802.11 standards, the ECC may be configured to use a Binary Convolutional Code (BCC) or a Large-Density Parity-Check (LDPC) code. Frequency-domain processing module 112 maps bits in one or more spatial streams into constellation points and performs spatial expansion. "Nsc" in the figure denotes the number of subcarriers.

Further in the transmit direction, FFT processor 116 transforms frequency-domain signals output by frequency-domain processing module 112 into time-domain signals, using a complex-to-complex Inverse FFT (IFFT) operation. The signals output by the IFFT are complex-valued signals comprising In-phase and Quadrature components (I/Q) signals. In some embodiments, the I/O signals carry the transmitted data modulated in symbols referred to as Orthogonal Frequency-Division Multiplexing (OFDM) symbols.

Time-domain processing module 120 up-samples the I/Q signals and filters the up-sampled I/Q signals using a TX Front-End (FE) filter, e.g., a Low Pass Filter (LPF), to exclude frequencies outside the frequency band allocated for transmitting the underlying packet. In some embodiments, the TX FE filter has a cutoff frequency of 20 MKz, 40 MHz or 80 MHz. In an embodiment a cutoff frequency 160 MHz is also supported, for a 160 MHz bandwidth. DAC 124 converts the filtered I/Q signals to analog form denoted TX I/Q signals, to be input to Li-Fi AFE 36.

In the receive direction (within PHY BX 102), ADC 128 receives from Li-Fi AFE 36 I/Q signals denoted RX I/Q signals and converts them into digital form. Time-domain processing module 120 filters and down-samples the RX I/Q signals, in accordance with the configured bandwidth (e.g., 20 MHz, 40 MHz or 80 MHz). FFT processor 116 converts the down-sampled RX I/Q signals into frequency domain using a complex-to-complex FFT operation. Frequency-domain processing module 112 applies equalization operation to the I/Q signals produced by the FFT to recover the underlying constellation points, and de-maps the constellation points into data bits. In some embodiments, the equalization operation is implemented using an equalizer having multiple taps. In such embodiments, frequency-domain processing module 112 calculates the equalizer taps, e.g., by performing channel estimation and smoothing, as depicted, for example, in FIG. 2.

The RX I/Q signals received via Li-Fi AFE 36 carry packets encoded using an ECC comprising, for example, a BCC or a LDPC code. FEC module 108 decodes the ECC of the packets to recover the un-coded packets, e.g., using any suitable decoder of the underlying ECC. For example, in some embodiments, when the packets are encoded using BCC, the packets may be decoded using a Viterbi decoder. Alternatively, when the packets are encoded using the LDPC code, the packets may be decoded using a suitable LDPC decoder. Framing module 104 identifies packet type, e.g., by inspecting the preamble and/or headers of the received packet and sends the packet with relevant parameters that are based on the packet type to MAC subsystem 44.

In some embodiments, time-domain processing module 120 further comprises an AGC 132 and a Radio Controller (RC) 136 that produce control signal(s) to AFE RX 64. AGC 132 may be used in implementing AGC 56 of FIG. 1. AGC 132 receives I/Q signals from ADC 128, down-sampled I/Q signals from time-domain processing module 120 or both. AGC 132 estimates a reception level from the I/Q signals and produces, based on the estimated reception level, an AGC control signal for adjusting reception gain in AFE RX 64. For example, the AGC control signal may be used for adjusting the gain of one or more amplifiers in RX AFE 64. In some embodiments, RC 136 produces a RC control signal for selecting a required bandwidth (e.g., cutoff frequency) for one or more filters within RX AFE 64, as will be described below.

Next are described various example embodiments that may be used for implementing Li-Fi AFE 36. In the description that follows, "Wi-Fi_FREQ" denotes the center frequency of a Wi-Fi RF band, and "Li-Fi_FREQ" denotes the center frequency of a Li-Fi optical band.

Figure 3A:
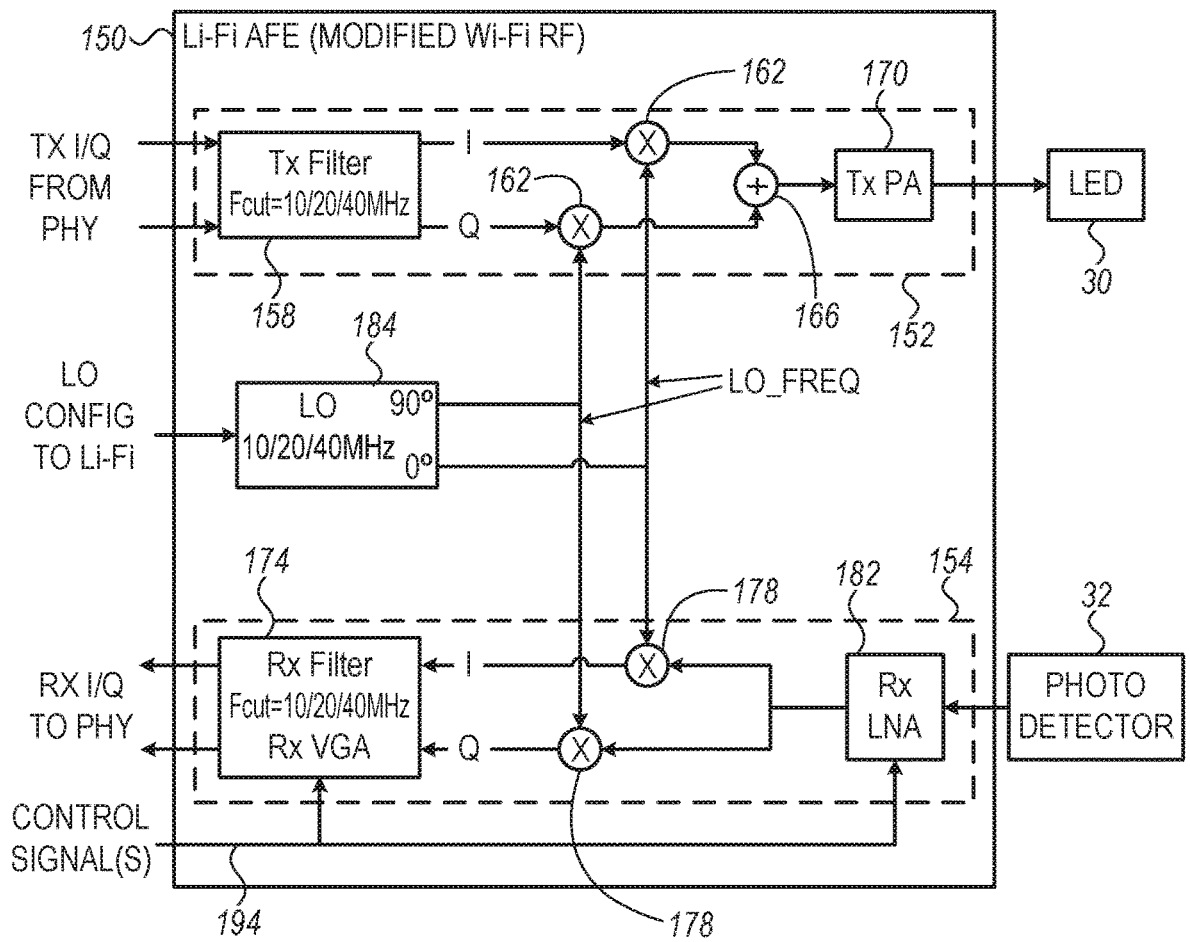
FIG. 3A is a block diagram that schematically illustrates a Li-Fi Analog Front End (AFE) implemented using a modified Wi-Fi Radio Frequency (RF) module, in accordance with an embodiment that is descried herein.
Figure 3B:
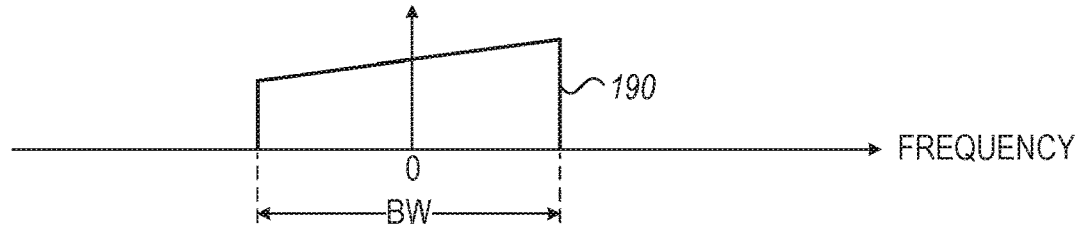
Figure 3C:
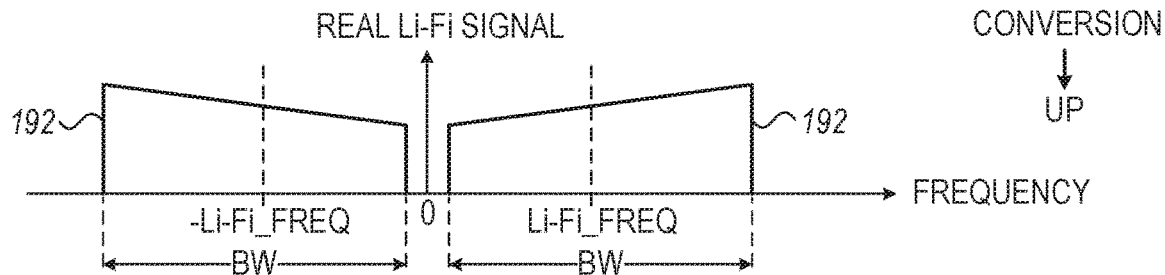

Implementing a Li-Fi Transceiver Using a Modified Wi-Fi RF Module of a Wi-Fi Device FIG. 3A is a block diagram that schematically illustrates a Li-Fi Analog Front End (AFE) 130, implemented using a modified Wi-Fi Radio Frequency (RF) module, in accordance with an embodiment that is descried herein. FIGS. 3B and 3C are diagrams that schematically illustrate spectral density functions of I/Q signals and Li-Fi signals processed in Li-Fi AFE 150 of FIG. 3A, in accordance with an embodiment that is descried herein.

Li-Fi AFE 150 of FIG. 3A comprises an AFE TX 152 for Li-Fi transmission and an AFE RX 154 for Li-Fi reception, which may be used in implementing respective AFE TX 62 and AFE RX 64 of FIG. 1.

AFE TX 152 and AFE RX 154 of Li-Fi AFE 150 use an architecture that generally resembles that of a Wi-Fi device (such as Wi-Fi device 40), which converts between baseband I/Q signals and Wi-Fi signals in a Wi-Fi RF band. In Li-Fi AFE 150, however, the architecture of the Wi-Fi device (or of a Wi-Fi module comprised in the Wi-Fi device) is modified for generating Li-Fi signals in a Li-Fi optical band instead of Wi-Fi signals in the Wi-Fi RF band.

AFE TX 152 comprise a TX filter 158, mixers 162, a signal combiner 166 and a TX Power Amplifier (PA) 170. ArE RX 154 comprises a RX filter 174, mixers 178 and a Low-Noise Amplifier (LNA) 182. Li-Fi AFE 150 further comprises a configurable LO 184 that supports converting baseband I/Q signals into a real Li-Fi signal in the Li-Fi optical band, as will be described below. LO 184 produces a 0-degree and a 90-degree LO signals having a frequency denoted LO_FREQ.

In a conventional Wi-Fi device, the LO signal is tuned to generate a Wi-Fi signal in the desired Wi-Fi RF band by generating LO signals having a frequency LO_FREQ=Wi-Fi_FREQ. In some embodiments, unlike a conventional Wi-Fi device, LO 184 comprises a dual-purpose LO that supports two different LO_FREQ frequencies. In one configuration LO 184 generates a Wi-Fi signal in the Wi-Fi RF band centered about Wi-Fi_FREQ. In the other configuration, LO 184 generates a Li-Fi signal in a Li-Fi optical band centered about Li-Fi_FREQ. In such embodiments, for Li-Fi communication, dual-purpose LO 184 is configured to LO_FREQ=Li-Fi_FREQ.

In the transmit direction, TX filter 158 receives TX I/Q signals from PHY subsystem 50. In the present example, the TX I/Q signals together comprise a complex signal in baseband. A spectral density function 190 of an example I/Q complex baseband signal having a bandwidth BW is depicted in the FIG. 3B. Spectral density function 190 is centered about the zero frequency, and typically has an asymmetric shape. In the present example, BW may be configured to 20 MHz, 40 MHz, 80 MHz. In some embodiments, BW may be also configured to 160 MHz.

TX Filter 158 filters the TX I/Q signals to exclude spectral content outside the BW band, e.g., above BW/2 and below −BW/2. Using the 0-degree and 90-degree LO signals, mixers 162 up-convert the filtered TX I/Q signals to Li-Fi_FREQ, by configuring LO 194 to LO_FREQ=Li-Fi_FREQ>BW/2. Signal combiner 168 combines the up-converted I/Q signals to produce a real signal, which TX PA 170 amplifies to produce a real Li-Fi signal that drives LED 30. A spectral density function 192 of the real Li-Fi signal corresponding to the TX I/O signals having spectral density function 190, is depicted in FIG. 3C. Spectral density 192 has positive and negative parts, centered about respective frequencies Li-Fi_FREQ and (−Li_Fi_FREQ), and having a bandwidth BW. Note that Li-Fi_FREQ should be larger than BW, as noted above.

In the receive direction, RX LNA 182 receives from photo detector 32 a real Li-Fi signal in the Li-Fi optical band and amplifies the real Li-Fi signal to be input to mixers 178. The received real Li-Fi signal may have a spectral density function 192, for example. Using the 0-degree and 90-degree LO signals of LO 184 configured to LO_FREQ=Li-Fi_FREQ, mixers 178 down-convert the real Li-Fi signal to baseband, thus producing an I signal (based on 0-degree LO signal) and a Q signal (based on 90-degree LO signal). RX filter 174 filters the down-converted I/Q signals to exclude spectral content outside the relevant band, e.g., having frequencies above BW/2 and below −BW/2. The filtered I/Q signals, denoted RX I/Q signals, are sent to PHY subsystem 50. In the present example, the RX I/Q signals have a spectral density function 190, corresponding to spectral density function 192 of the received Li-Fi signal.

In some embodiments, Li-Fi AFE 150 receives (e.g., from the PHY RX 102) control signals 194 comprising, for example, an AGC control signal, a RC control signal or both. In some embodiments, the AGC control signal is produced by AGC 132 and is used for adjusting the gain of RX LNA 182. In some embodiments, in addition to RX filter 174 RX, PHY 102 comprises a Variable Gain Amplifier (VGA) (not shown) that amplifies the RX I/Q signals based on the AGC control signal. In some embodiments, the RC control signal is produced by RC 136 of PHY RX 102, and is used for selecting a bandwidth cutoff frequency such as BW/2 in RX filter 174, among BW bandwidths 20 MHz, 40 MHz, 80 MHz and possibly 160 Hz.

In an embodiment, in which Li-Fi AFE 150 comprises a Wi-Fi RF module modified to comprise a LO 184 that supports both Wi-Fi and Li-Fi, LO 184 is configured to LO_FREQ=Li-Fi_FREQ for generating the Li-Fi signal. Alternatively, Li-Fi AFE 150 comprises a Wi-Fi RF module, modified to comprise LO 184 that supports producing an LO signal only for Li-Fi communication. In this case, the Wi-Fi RF module is modified by replacing a LO device of the W-Fi RF module that supports producing only a LO signal for W-Fi communication, with LO 184 that supports producing a LO signal for Li-Fi communication.

Figure 4A:
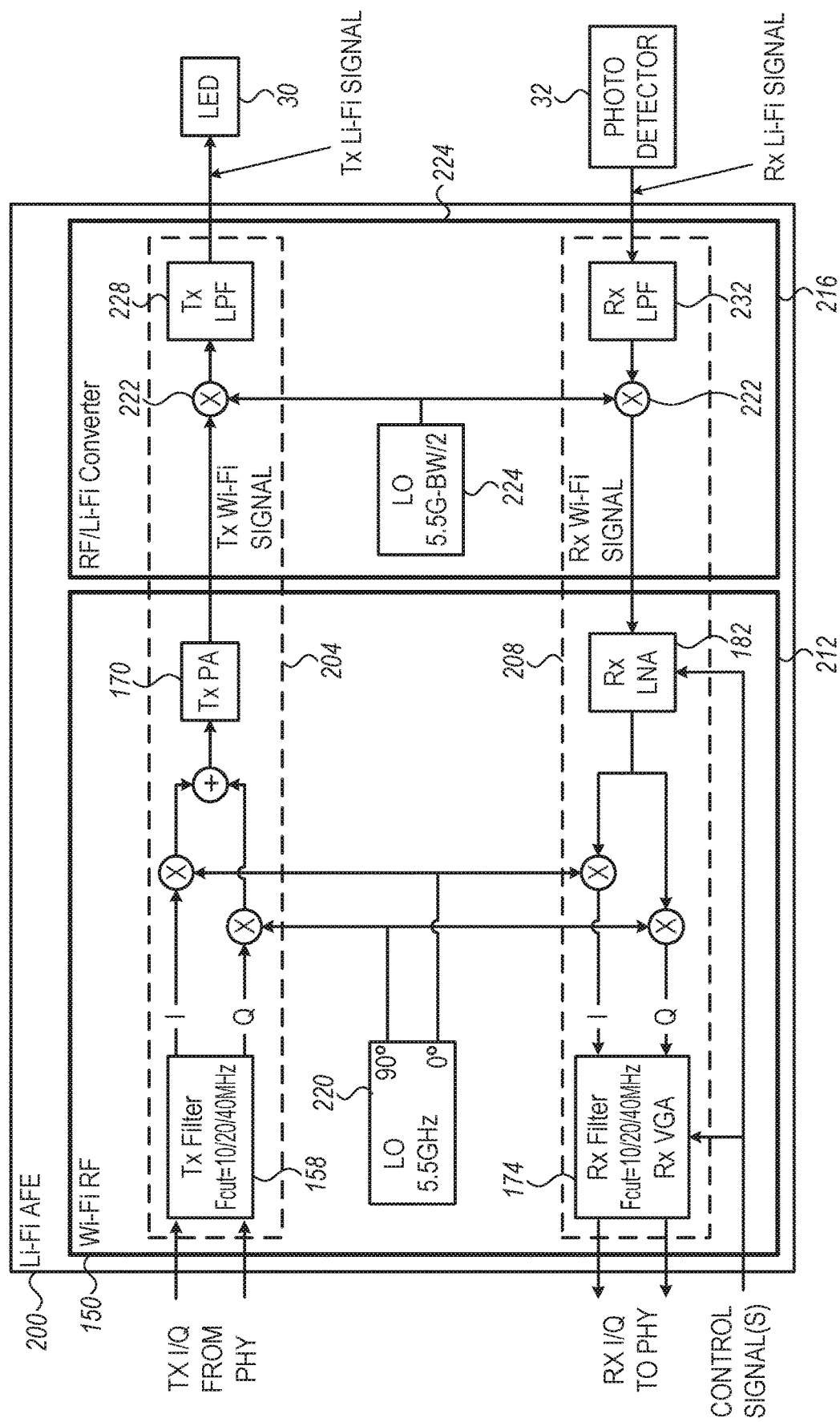
FIG. 4A is a block diagram that schematically illustrates a Li-Fi AFE, implemented using a two-step frequency conversion, in accordance with an embodiment that is descried herein.
Figure 4B:
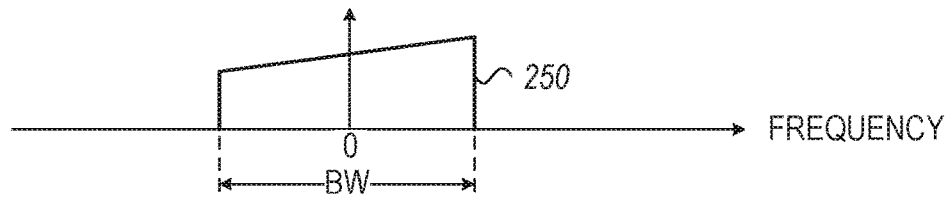
FIGS. 4B, 4C and 4D are diagrams that schematically illustrate spectral density functions of respective I/Q signals, Wi-Fi signals and Li-Fi signals processed in Li-Fi AFE of FIG. 4A, in accordance with an embodiment that is descried herein.
Figure 4C:
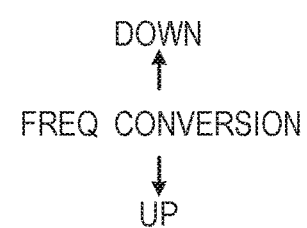
Figure 4D:
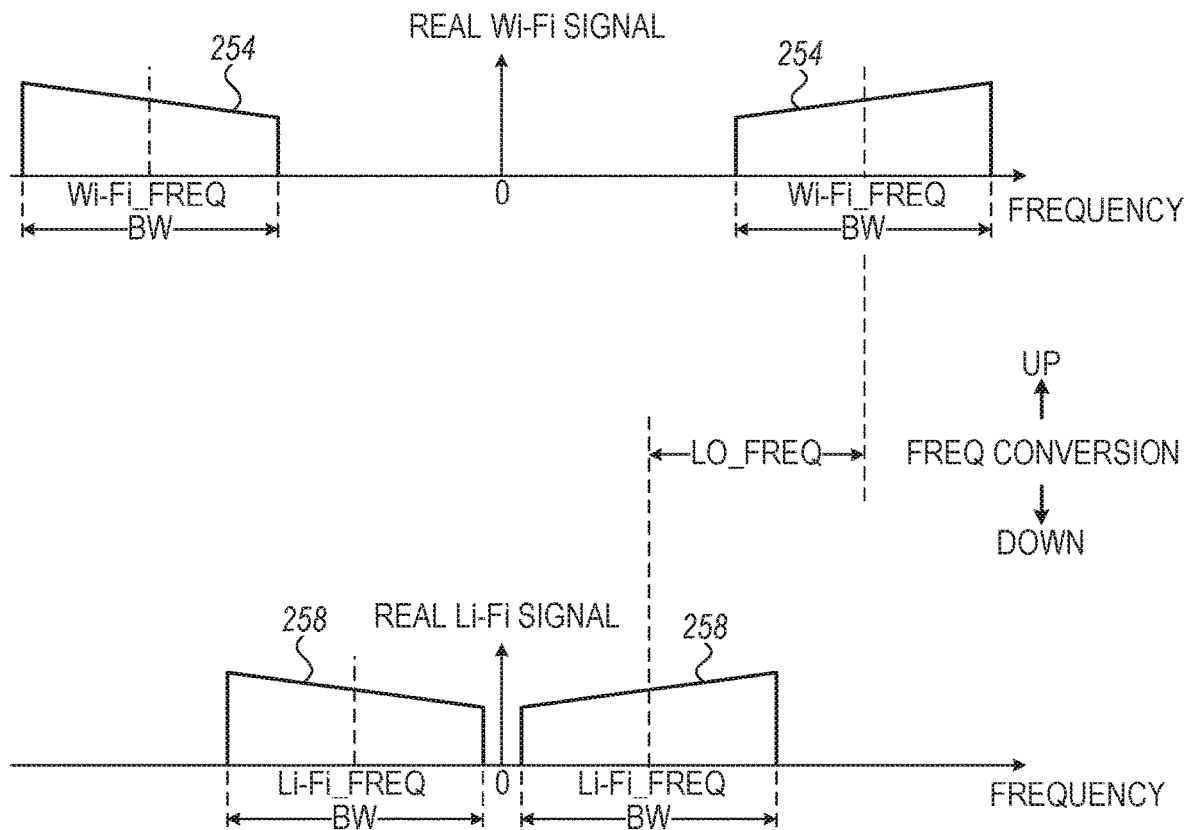

Implementing a Li-Fi Transceiver Using a Wi-Fi RF Module and a Two-Step Frequency Conversion FIG. 4A is a block diagram that schematically illustrates a Li-Fi AFE 200, implemented using a two-step frequency conversion, in accordance with an embodiment that is descried herein. FIGS. 4B, 40 and 4D are diagrams that, schematically illustrate spectral density functions of respective I/O signals, Wi-Fi signals and Li-Fi signals processed in Li-Fi AFE 200 of FIG. 4A, in accordance with an embodiment that is descried herein.

In FIG. 4A, Li-Fi AFE 200 comprises an AFE TX 204 for Li-Fi transmission and an AFE RX 208 for Li-Fi reception, which may be used for implementing respective AFE TX 62 and AFE RX 64 of FIG. 1. In the example of FIG. 4A, the implementation of AFE TX 204 and AFE RX 208 is partitioned between a Wi-Fi RF module 212 (of a Wi-Fi device) and a RF/Li-Fi converter 216, which together perform a two-step frequency conversion between baseband and a Li-Fi optical band, as will be described below.

In some embodiments, Wi-Fi RF module 212 performs frequency conversion between baseband and a selected Wi-Fi RF band, whereas RF/Li-Fi module 216 converts between the selected Wi-Fi RF band and the Li-Fi optical band. In the embodiment of FIG. 4A conversion between baseband and the Li-Fi optical band involves a two-step frequency conversion via the intermediate Wi-Fi RF band.

Wi-Fi RF module 212 has a similar architecture to that Li-Fi AFE 150 of FIG. 3A. The data flows in the transmit and received directions described for Li-Fi AFE 150 are therefore generally applicable to Wi-Fi RF module 212, as well. Wi-Fi RF module 212, however, supports frequency conversion between baseband and Wi-Fi signals in a selected Wi-Fi RF band, and not between baseband I/Q signals and a Li-Fi optical band, as in AFE 150. To this end, Wi-Fi RF module 212 comprises a LO 220 that generates 0-degree and 90-degree LO signals for frequency up-conversion and down-conversion between baseband and the selected Wi-Fi RF band. In the present example, LO 220 is tuned to the 5.5 GHz Wi-Fi RF band of the IEEE 602.11 family of standards. Alternatively, other Wi-Fi bands such as the 2.4 GHz band can also be used. In the present embodiment, Wi-Fi RF module 212 thus comprises a Wi-Fi RF module of a conventional Wi-Fi device.

FIG. 4B depicts an example spectral density function 250 of TX and RX I/Q signals in baseband having a bandwidth BW (similarly to spectral density 190 of FIG. 3B). FIG. 4C depicts a spectral density function 254 of a Wi-Fi signal corresponding to the baseband TX I/Q and RX I/Q signals having spectral density function 250, in a Wi-Fi RF band centered about Wi-Fi_FREQ.

RF/Li-Fi converter 216 mediates between the Wi-Fi RF band and the Li-Fi optical sand. RF/Li-Fi converter 216 comprises mixers 222, a second LO 224, a TX LPF 228 and a RX LPF 232. Second LO 224 generates 0-degree and 90-degree LO signals at a frequency Wi-Fi_FREQ-Li-Fi_FREQ. Note that LO_FREQ should satisfy the expression LO_FREQ<Wi-Fi_FREQ-BW/2.

In the transmit, direction, using the LO signal of second LO 224, mixer 222 down-converts the real Wi-Fi signal generated by Wi-Fi RF module 212 to a Li-Fi signal in the Li-Fi optical band, centered about Li-Fi_FREQ. TX LPF 228 filters the down-converted signal to include the spectral content of the Li-Fi signal and exclude frequencies outside the Li-Fi optical band. FIG. 4D depicts a spectral density 258 of the resulting real Li-Fi signal (similar to spectral density function 192 of FIG. 3C above).

In the receive direction, RF/Li-Fi converter receives a real Li-Fi signal from photo detector 32. RX LPF 236 filters the real Li-Fi signal to exclude spectral content having frequencies outside the Li-Fi optical band. Using the LO signal of second LO 224, a mixer 222 up-converts the Li-Fi signal from the Li-Fi optical band to the Wi-Fi RF band centered about Wi-Fi_FREQ, as depicted in FIG. 4C. Wi-Fi RF module 212 down-converts the Wi-Fi signal to baseband, to produce RX I/Q signals having spectral density function 250.

A Li-Fi Transceiver Configured to a Partial-Band Mode and Using Only an I or a Q Component FIG. 5A is a block diagram that schematically illustrates a Li-Fi transceiver 300 in which a Li-Fi signal is produced from only the I component of a complex signal produced by a PHY subsystem configured to operate in a partial-bandwidth mode, in accordance with an embodiment that is described herein. FIGS. 5B and 5C are diagrams that schematically illustrate spectral density functions of complex signals in a partial-bandwidth mode of the PHY subsystem and Li-Fi signals processed in Li-Fi transceiver 300 of FIG. 5A, in accordance with an embodiment that is descried herein.

Li-Fi transceiver 300 comprises a Wi-Fi BB 304 and a Li-Fi AFE 308. Li-Fi transceiver 300 may be used for implementing Li-Fi transceiver 24 of FIG. 1, in which Wi-Fi BB 304 implements Wi-Fi BB 34 and Li-Fi AFE 308 implements Li-Fi AFE 36.

Wi-Fi BB 304 comprises a MAC TX 312, a PHY TX 314, a MAC RX 316, a PHY RX 318 an AGC 320, and a MAC controller 322. Wi-Fi BB 304 is essentially similar to Wi-Fi BB 34 that comprises similar respective elements, as described above with reference to FIG. 1.

In Li-Fi transceiver 300, MAC controller 322 (or another processor of the Li-Fi transceiver, not shown) configures PHY TX 314 and PHY RX 318 to operate in a mode referred to herein as a "partial-bandwidth" mode. In the partial-bandwidth mode, PHY TX 314 produces, and PHY RX 318 receives a complex signal having a bandwidth smaller than the bandwidth BW allocated for the underlying channel. In the present example, the partial bandwidth used is denoted BWH, wherein BWH-BW/2, and the BWH band is centered about the frequency Li-Fi_FREQ, as depicted, for example, in spectral density function 350 in FIG. 5B. For example, for a channel BW of 20 MHz, 40 MKz and 80 MHZ, the respective partial bandwidth BWH is given by 10 MHz, 20 MHz and 40 MHz. Note that in the present embodiment, Li-Fi_FREQ should be larger than BWH/2. Using half the bandwidth is given by way of example and is not mandatory. In alternative embodiments, other partial-bandwidth configurations can be used, e.g., using a BW/4 partial bandwidth mode. As another example, in a ⅛ partial bandwidth mode, 20 MHz out of 160 MHz may be used.

Li-Fi AFE 308 comprises a TX filter 324, a TX PA 326, a RX filter 328 and a RX LNA 330. TX PA 326 and RX LNA 330 may be identical or similar to TX PA 170 and RX LNA 182 of FIG. 3A. TX filter 324 and RX filter 328 are similar to respective TX filter 158 and RX filter 174 of FIG. 3A, but are configured to process a real signal rather than a complex signal comprising I/C signals as in FIG. 3A.

In the transmit direction, TX filter 324 receives only the I component of the complex signal generated by PHY TX 314. The I component comprises a real Li-Fi signal having a spectral density function 354, as depicted in FIG. 5C. TX PA 326 amplifies the real Li-Fi signal for driving LED 30. In the receive direction, RX LNA 330 receives from photo detector 32 a real Li-Fi signal having, for example, a spectral density function 354 and amplifies the received Li-Fi signal. RX filter 328 filters the amplified signal to exclude frequencies outside the Li-Fi optical band and sends the filtered signal as an I component to PHY RX 318, which recovers the corresponding complex signal having a spectral density 350.

The complexity of Li-Fi AFE 308 is very low because Li-Fi AFE 308 does not perform any frequency conversion, which typically involves using elements such as a LO and mixers.

Although Li-Fi transceiver 300 in FIG. 5A is based on the I component of a complex I/Q signal, a similar Li-Fi transceiver may be implemented based only on the Q component.

A WLAN Transceiver Supporting Both Li-Fi and Wi-Fi

Figure 6:
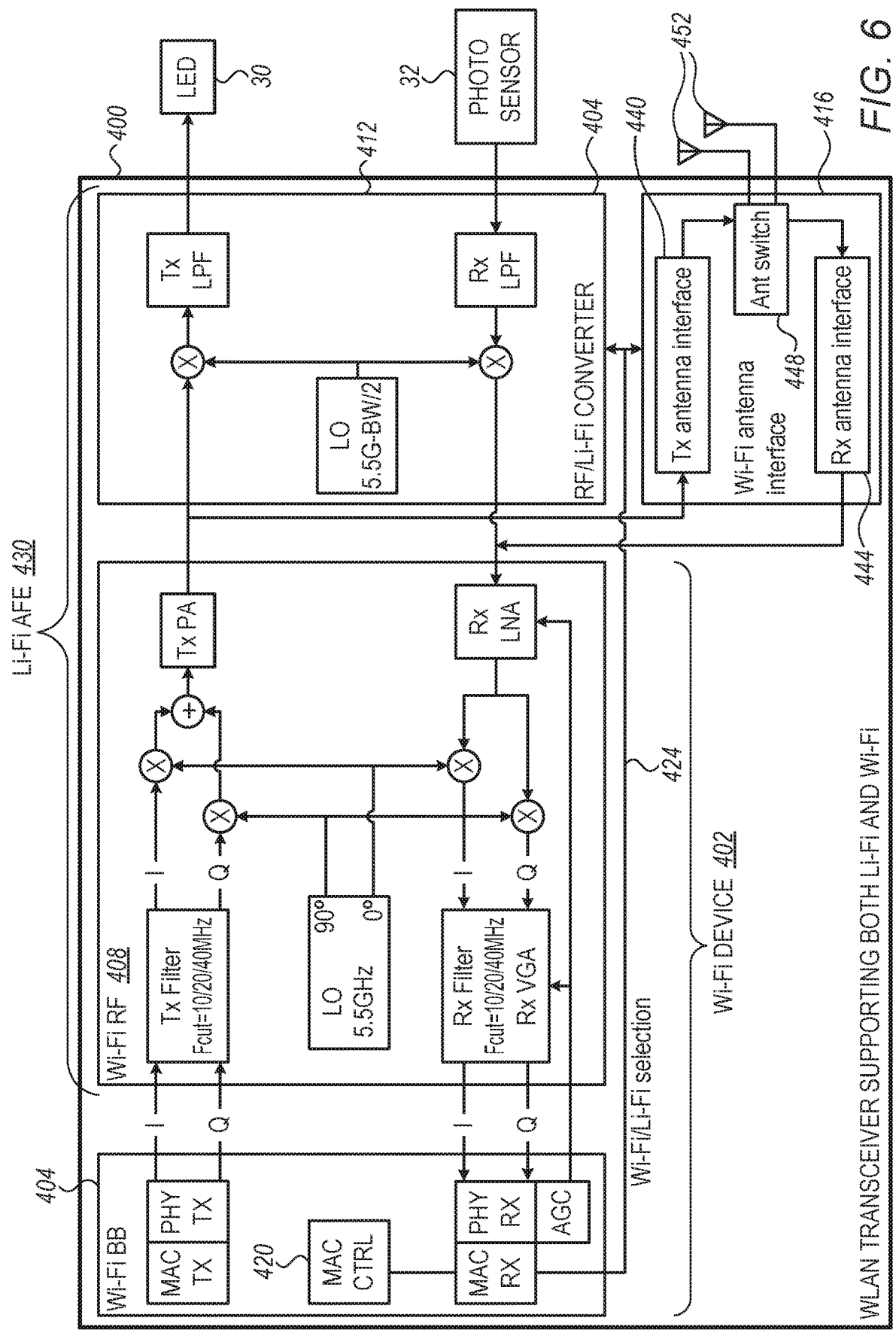
FIG. 6 is a block diagram that schematically illustrates a WLAN transceiver that supports both Li-Fi and Wi-Fi communication, in accordance with an embodiment that is described herein.

FIG. 6 is a block diagram that schematically illustrates a WLAN transceiver 400 that supports both Li-Fi and Wi-Fi communication, in accordance with an embodiment that is described herein.

WLAN transceiver 400 comprises a Wi-Fi device 402 comprising a Wi-Fi BB 404 coupled to a Wi-Fi RF module 408. WLAN transceiver 400 further comprises a RF/Li-Fi converter 412 and a Wi-Fi antenna interface 416. In some embodiments, Wi-Fi device 402 connects to one of RF/Li-Fi converter 412 and Wi-Fi antenna interface 416, or to both, e.g., using a switching circuit (not shown) so that at any given time WLAN transceiver 400 may communicate over a Li-Fi optical band, over a Wi-Fi RF band, or both.

Wi-Fi BB 404 functions similarly to Wi-Fi BE 34 of FIG. 1, and comprises similar elements such as a MAC TX, a MAC RX, a PHY TX, a PHY RX and an AGC. Wi-Fi BB 404 comprises a MAC controller 420 that is similar to MAC controller 49 of FIG. 1. Among other tasks, MAC controller 420 selects communication over Li-Fi, Wi-Fi, or both, e.g., using a suitable selection signal 424.

When WLAN transceiver 400 is configured to Li-Fi communication, Wi-Fi RF module 408 and RF/Li-Fi converter together function as a Li-Fi AFE 430, similarly to Li-Wi AFE 200 with Wi-Fi RF module 212 and RF/Li-Fi converter 216, as described with reference to FIG. 4A above.

Wi-Fi antenna interface comprises a TX antenna interface 440, a RX antenna interface 444 and an antenna switch 448 coupled to one or more RF antennas 452. When WLAN transceiver 400 is configured to communicate over Wi-Fi, in the transmit direction, antenna switch 448 connects between Wi-Fi TX antenna interface 440 and antennas 452 for transmitting a Wi-Fi signal generated by Wi-Fi RF module 408. In the receive direction, switch 448 connects between antennas 452 and Wi-Fi RX antenna interface 444 for sending a received Wi-Fi signal to Wi-Fi RF module 408.

In some embodiments, WLAN transceiver 400 operates in a Wi-Fi Multiple-In Multiple-Out (MIMO) configuration, in which transmission and reception of Wi-Fi signals is carried out via multiple antennas 452. In such embodiments, Wi-Fi RF module 408 comprises multiple TX chains and multiple RX chains, e.g., a pair of a TX chain and a RX chain per Wi-Fi antenna (not shown). In such embodiments, the antenna switch supports switching between the multiple antennas and the relevant TX chains and RX chains.

The configurations of wireless Li-Fi system 20 shown in FIGS. 1 and 2, including various Wi-Fi device and AFE configurations shown in FIGS. 3A, 4A and 5A, and the configuration of WLAN transceiver 400 shown in FIG. 6 are example configurations, which are chosen purely for the sake of conceptual clarity. In alternative embodiments, any other suitable Li-Fi system, Wi-Fi device, AFE and WLAN transceiver configurations can be used.

The division of functions among Wi-Fi device 40, Wi-Fi BB 34, Li-Fi AFE 36 and optical interface 26 may differ from the division shown in FIG. 1. For example, Wi-Fi BB 34, Li-Fi AFE 36 and optical interface 26 may be integrated in a single device (e.g., on a single silicon die) or implemented in separate devices (e.g., separate silicon dies). Alternatively, the pair—Wi-Fi BB 34 and Li-Fi AFE 36 and the pair—Li-Fi AFE 36 and optical interface 26, may be separately implemented, each pair in a single device. In WLAN transceiver 400, Wi-Fi antenna interface 416 may be comprised within or external to Wi-Fi device 402.

The different elements of Li-Fi transceiver 24 and the different elements of WLAN transceiver 400 may be implemented using suitable hardware, such as in one or more RFICs, Application-Specific Integrated Circuits (ASICs) or Field-Programmable Gate Arrays (FPGAs). In some embodiments, some elements of Li-Fi transceiver 24 and some elements of WLAN transceiver 400, e.g., Wi-Fi BB 34 including MAC controller 49 and Wi-Fi BB 404 including MAC controller 420, can be implemented using software, or using a combination of hardware and software elements. Elements of Li-Fi transceiver 24 and of WLAN transceiver 400 that are not mandatory for understanding of the disclosed techniques have been omitted from the figure for the sake of clarity.

In some embodiments, Wi-Fi BB 34 (and/or MAC controller 49), Wi-Fi BB 404 (and/or MAC controller 420) or both comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory. This processor may be internal or external to the relevant Wi-Fi BB module.

A Method for Switching Between Li-Fi and Wi-Fi

Figure 7:
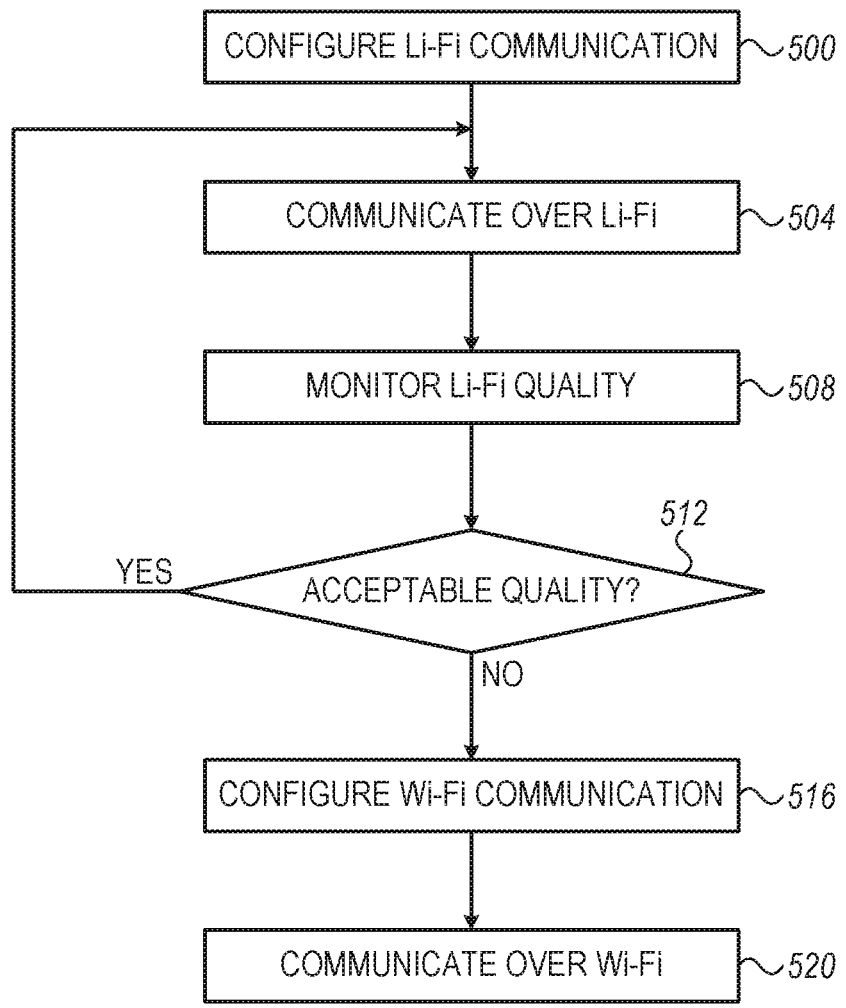
FIG. 7 is a flow chart that schematically illustrates a method for switching between Li-Fi and Wi-Fi communication in WLAN transceiver of FIG. 6, in accordance with an embodiment that is described herein.

FIG. 7 is a flow chart that schematically illustrates a method for switching between Li-Fi and Wi-Fi communication in WLAN transceiver 400 of FIG. 6, in accordance with an embodiment that is described herein.

The method will be described as executed by various elements of WLAN transceiver 400.

The method begins with MAC controller 420 selecting a communication configuration over Li-Fi, at a Li-Fi configuration step 500. In the present example, Li-Fi communication serves as a default communication mode. In some embodiments, MAC controller 420 generates a suitable selection signal (424) for connecting between Wi-Fi RF module 408 and RF/Li-Fi converter 412, and disconnecting between Wi-Fi RF module 408 and Wi-Fi antenna interface 416.

At a Li-Fi communication step 504, WLAN transceiver 400 communicates with one or more remote client stations over the Li-Fi optical band. RF/Li-Fi converter 412 converts between Wi-Fi signals generated by Wi-Fi device 402 and Li-Fi signals in the Li-Fi optical band, as described above.

At a monitoring step 508, MAC controller 420 monitors the communication quality over Li-Fi. For example, MAC controller 420 monitors the communication quality by monitoring signal level at one or more points along the Li-Fi reception path. At a quality verification step 512, MAC controller 420 checks whether the communication quality over Li-Fi is acceptable. MAC controller 420 may detect that the communication quality is unacceptable when one or more monitored signals in the Li-Fi reception path drop below a predefined threshold quality. This may occur, for example, when the light channel between WLAN transceiver 400 and remote station(s) becomes blocked, e.g., by some non-transparent or partially transparent physical object.

When at step 512 the communication quality is acceptable, the method loops back to step 504, to continue communicating over Li-Fi. Otherwise, the method proceeds to a Wi-Fi configuration step 516, at which MAC controller 420 configures WLAN transceiver 400 to communicate over Wi-Fi instead of over Li-Fi. In some embodiments, MAC controller 420 generates selection signal 424 for disconnecting between Wi-Fi RF module 408 and RF/Li-Fi converter 412, and connecting between Wi-Fi RF module 408 and Wi-Fi antenna interface 416.

At a Wi-Fi communication step 520, WLAN transceiver 400 communicates with one or more remote client stations over Wi-Fi via Wi-Fi antenna interface 416, as described above. Following step 520 the method terminates.

In the method of FIG. 7, the WLAN transceiver communicates over Li-Fi, and switches to communicate over Wi-Fi when Li-Fi communication fails. In this configuration, Wi-Fi communication mode serves as a backup mode for the default Li-Fi communication mode. In alternative embodiments, WLAN transceiver 400 communicates over Li-Fi and over Wi-Fi in parallel. By using Li-Fi and Wi-Fi in parallel, higher data rates may be achieved compared to using only Wi-Fi or Li-Fi alone. Parallel operation may also provide fast switching between or fallback to one of the Wi-Fi and Li-Fi systems. Parallel communication over Li-Fi and Wi-Fi may be effective in environments in which both the Li-Fi optical band and the Wi-Fi RF band may suffer from interferences.

The embodiments described above are given by way of example, and other suitable embodiments can also be used. For example, in WLAN transceiver 400, the MAC controller may switch between Li-Fi and Wi-Fi communication dynamically based on identifying varying environmental conditions such as reception quality, interference and the like.

In some of the disclosed embodiments, the LO signal frequency is required to be larger than BW/2. The LO signal frequency may be selected sufficiently high above BW/2 to avoid light-related interferences that may fall in a frequency range close to the zero frequency.

Although the embodiments described above mainly address signals in baseband at the PHY layer, in alternative embodiments, the PHY layer may handle signals in a suitable Intermediate Frequency (IF). In this case, the spectral density function of the complex I/Q signals may not be centered about zero frequency.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Wireless LAN (WLAN) Li-Fi transceiver, comprising:
   a Wi-Fi device, configured to:
      produce a spatial stream carrying data; and
      produce from the spatial stream a complex-valued signal comprising In-phase and Quadrature (I/Q) signal components, wherein the complex-valued signal is centered about a Li-Fi frequency for a predefined optical band; and
   an Analog Front-End (AFE), configured to:
      produce a Li-Fi signal in the predefined optical band, based only on the In-phase signal component or on the Quadrature signal component of the complex-valued signal; and
      transmit the data carried by the spatial stream to a remote Li-Fi receiver by driving an optical emitter with the Li-Fi signal.

2. The WLAN Li-Fi transceiver according to claim 1, wherein the Wi-Fi device is configured to produce complex-valued OFDM symbols, and to produce the In-phase and Quadrature signal components of the complex-valued signal based on respective real and imaginary components of the OFDM symbols.

3. The WLAN Li-Fi transceiver according to claim 1, wherein the Wi-Fi device is configured to connect to an optical interface for communicating over Li-Fi or to a RF interface for communicating over Wi-Fi, wherein the Wi-Fi device is configured to produce a Wi-Fi signal in the RF band, the optical interface is configured to apply frequency conversion between the RF band of the Wi-Fi signal and the optical band, and wherein the RF interface is configured to connect between the Wi-Fi device and a RF antenna.

4. The WLAN Li-Fi transceiver according to claim 3, wherein at least one of the Wi-Fi device and the AFE is configured to monitor Li-Fi communication quality level via the optical interface, and in response to detecting that communication via the optical interface degrades below a predefined quality level, the AFE is configured to communicate the Wi-Fi signal via the RF interface.

5. The WLAN Li-Fi transceiver according to claim 3, wherein the AFE is configured to communicate the Wi-Fi signal via both the optical interface and the RF interface, in parallel.

6. A method for wireless communication, comprising:
   in a Wireless LAN (WLAN) Li-Fi transceiver, comprising a Wi-Fi device and an Analog Front-End (AFE), producing, by the Wi-Fi device, a spatial stream carrying data, and producing from the spatial stream a complex-valued signal comprising In-phase and Quadrature (I/Q) signal components, wherein the complex-valued signal is centered about a Li-Fi frequency for a predefined optical band;
   producing a Li-Fi signal in the predefined optical band, based only on the In-phase signal component or on the Quadrature signal component of the complex-valued signal, and transmitting the data carried by the spatial stream to a remote Li-Fi receiver by driving an optical emitter with the Li-Fi signal.

7. The method according to claim 6, wherein producing the I/Q signals comprises producing complex-valued OFDM symbols, and producing the In-phase and Quadrature signal components of the complex-valued signal based on respective real and imaginary components of the OFDM symbols.

8. The method according to claim 6, and comprising connecting the Wi-Fi device to an optical interface for communicating over Li-Fi or to a RF interface for communicating over Wi-Fi, and comprising producing, by the Wi-Fi device, a Wi-Fi signal in the RF band, applying, by the optical interface, frequency conversion between the RF band of the Wi-Fi signal and the optical band, and connecting, by the RF interface, between the Wi-Fi device and a RF antenna.

9. The method according to claim 8, and comprising monitoring Li-Fi communication quality level via the optical interface, and in response to detecting that communication via the optical interface degrades below a predefined quality level, communicating the Wi-Fi signal via the RF interface.

10. The method according to claim 8, and comprising communicating the Wi-Fi signal via both the optical interface and the RF interface, in parallel.

* * * * *